(12) United States Patent
Tuominen

(10) Patent No.: US 9,432,132 B2
(45) Date of Patent: Aug. 30, 2016

(54) SYSTEM AND METHOD FOR TESTING RADIO-FREQUENCY TAGS

(71) Applicant: Voyantic Oy, Espoo (FI)

(72) Inventor: Jesse Tuominen, Espoo (FI)

(73) Assignee: Voyantic Oy, Espoo (FI)

( * ) Notice: Subject to any disclaimer, the term of this patent is extended or adjusted under 35 U.S.C. 154(b) by 0 days.

(21) Appl. No.: 14/389,392

(22) PCT Filed: Mar. 28, 2013

(86) PCT No.: PCT/FI2013/050350
§ 371 (c)(1),
(2) Date: Sep. 30, 2014

(87) PCT Pub. No.: WO2013/144451
PCT Pub. Date: Oct. 3, 2013

(65) Prior Publication Data
US 2015/0056918 A1    Feb. 26, 2015

(30) Foreign Application Priority Data

Mar. 30, 2012  (FI) ..................................... 20125363

(51) Int. Cl.
| | |
|---|---|
| *H04B 5/00* | (2006.01) |
| *G06K 7/10* | (2006.01) |
| *H04B 17/00* | (2015.01) |
| *G06K 7/00* | (2006.01) |
| *H04W 4/00* | (2009.01) |

(52) U.S. Cl.
CPC ............. *H04B 17/00* (2013.01); *G06K 7/0008* (2013.01); *G06K 7/10326* (2013.01); *G06K 7/10465* (2013.01); *H04B 5/0031* (2013.01); *H04W 4/008* (2013.01)

(58) Field of Classification Search
CPC   H04B 5/0012; H04B 5/0043; H04B 17/318; H04B 17/29; H04W 4/008; H04W 24/08; G06K 7/10465
See application file for complete search history.

(56) References Cited

U.S. PATENT DOCUMENTS

| | | | | |
|---|---|---|---|---|
| 4,731,875 | A | * 3/1988 | Mizukami | .............. H03D 7/165 |
| | | | | 455/302 |
| 6,104,291 | A | 8/2000 | Beauvillier et al. | |
| 6,895,226 | B1 | * 5/2005 | Forster | .................... G01S 7/034 |
| | | | | 340/10.33 |

(Continued)

FOREIGN PATENT DOCUMENTS

| | | |
|---|---|---|
| EP | 1755068 A2 | 2/2007 |
| EP | 1857968 A2 | 11/2007 |

(Continued)

*Primary Examiner* — Andrew Wendell
(74) *Attorney, Agent, or Firm* — Seppo Laine Oy

(57) ABSTRACT

The invention relates to a system and method for testing radio-frequency tags (18). The system comprises a reading zone (17) for a radio-frequency tag and at least two electrodes (11A,11B) for capacitively coupling to the tag placed in the reading zone. According to the invention, the system further comprises a communication terminal (14) connected to each of the at least two electrodes for feeding signals to the electrodes and for reading tag response signals from the electrodes, and a hybrid coupler (13) for causing a phase difference between the excitation signals fed to the at least two electrodes from the communication terminal and for combining the response signals from the at least two electrodes at the communication terminal (14). The invention allows for efficient coupling to tags in near field and relieves the tag positioning requirements during testing.

9 Claims, 3 Drawing Sheets

(56) References Cited

U.S. PATENT DOCUMENTS

| | | |
|---|---|---|
| 2004/0195319 A1 | 10/2004 | Foster |
| 2007/0117511 A1* | 5/2007 | Kwon ............... H04B 1/525 |
| | | 455/63.1 |
| 2007/0171071 A1 | 7/2007 | Chiu et al. |
| 2007/0206705 A1 | 9/2007 | Stewart |
| 2009/0096556 A1* | 4/2009 | Washiro ............ H01Q 1/36 |
| | | 333/24 R |
| 2009/0146816 A1* | 6/2009 | Patel ................. G01S 5/04 |
| | | 340/572.1 |
| 2011/0012713 A1* | 1/2011 | Wilkinson ......... G06K 7/10178 |
| | | 340/10.3 |
| 2012/0001735 A1* | 1/2012 | Fink .................. G06K 19/0675 |
| | | 340/10.4 |
| 2012/0319797 A1* | 12/2012 | Tamaru .............. H01P 5/184 |
| | | 333/112 |

FOREIGN PATENT DOCUMENTS

| | | |
|---|---|---|
| EP | 1990784 A1 | 11/2008 |
| EP | 2006794 A1 | 12/2008 |
| EP | 1989559 B1 | 6/2010 |

\* cited by examiner

SYSTEM AND METHOD FOR TESTING RADIO-FREQUENCY TAGS

FIELD OF THE INVENTION

The invention relates to radio-frequency identification (RFID) technology. In particular, the invention relates to testing of radio-frequency transponders (tags) on a production line.

BACKGROUND OF THE INVENTION

RFID transponders must be tested in their production process in order to detect and mark deficient ones. Deficiency can be detected by measuring their performance through frequency response, which reveals their sensitivity and transponder RF-bandwidth, for example. There exists a performance test standard ISO 18046-3, which is commonly used.

In the case of transponders intended to be used in a far field (radiative field, in contrast to near/reactive field transponders, such as inductive transponders), a problem arises relating to the closeness of individual transponders with each other in typical production lines (e.g. roll to roll production). Far field cannot be easily focused to an individual transponder so that the frequency response would be obtained only from that particular transponder. Thus, on-line performance testing must be made using some indirect route.

Various solutions for this have been presented, such as selecting the transponder to be measured on the basis of its memory content and screening the surrounding transponders or inactivating them for the duration of the far field detection. However these solutions have their own practical problems. A screening structure should be designed separately for each type of transponder, with the consequent additional engineering work.

There are many publications relating to quality control of RFID transponders, patent (application) publications dealing with the present subject in general as well as proposing specific testing solutions are at least EP 1990784, EP 1989559, and CN 10103361, US 2006/0012387, US 2006/271328, US 2006/226983, and WO 2011/042603. In addition, some special devices for testing have been proposed, for example that disclosed in WO 2006/030060. The device comprises a partitioned measuring chamber and capacitive electrodes in each compartment. The device is intended for measuring the excitation signal coupling to and passing through the transponder from one electrode to another. Thus, the device is not as such suitable for real performance testing including frequency response testing.

General problems relating to existing on-line testing technology are inaccuracy, complexity and slowness. Indeed, it has shown to be very difficult to achieve an on-line testing system, which reflects the true performance of the tags with a reasonable instrumentation costs and without restricting the production speed of the transponders. Since the present production technology is very developed, the testing stage is often the stage restricting the speed of the overall process. The present testing methods also vary a lot in their robustness, i.e., their ability to detect faulty transponders if the measurement conditions are slightly changed. For example, some methods are very sensitive to the exact position of the transponder to be tested with respect to the surrounding instrumentation.

Thus, there exists a need for improved RFID testing solutions.

SUMMARY OF THE INVENTION

It is an aim of the present invention to solve at least part of the abovementioned problems and to provide an improved RFID testing system and method.

A particular aim of the invention is to provide a simple system by which performance measurements can be carried out which reflect the true performance of far field transponders.

The aims of the invention are achieved by the system and method as defined in the independent claims.

According to one aspect, the present system comprises a reading zone for a radio-frequency tag, and at least two electrodes creating an electric field between them that capacitively couples to the tag placed in the reading zone. According to the invention there is provided a communication terminal connected to each of the at least two electrodes for feeding signals to the electrodes and for reading tag response signals from the electrodes, and a hybrid coupler for causing a phase difference between the excitation signals fed to the at least two electrodes from the communication terminal and for combining the response signals from the at least two electrodes at the communication terminal.

The term "hybrid coupler" means any device capable of taking an input signal and providing two output signals have a phase difference. Typically, the phase difference is at least 10°, preferably 30°-180°, more preferably 90-180° , in particular 150-180°. According to one embodiment, the phase difference is 180°.

The present method of testing a radio-frequency tag comprises
- providing at least two electrodes capable of capacitively coupling to a radio-frequency tag brought to a reading zone in the vicinity of the two electrodes,
- providing a radio-frequency tag to the reading zone,
- capacitively exciting the radio-frequency tag using said at least two electrodes by simultaneously feeding excitation signals to said at least two electrodes such the excitation signals have a phase difference with respect to each other,
- capacitively reading the response of the tag using said at least two electrodes.

The invention is based on the observation that excitation signals having a phase difference and being capacitively coupled to a far field transponder, can form a field which simulates well the situation in a real far field, in the vicinity (at a distance less than 10 cm, even less than 5 cm) from the electrodes. Thus, the transponder can be brought close to the electrodes, whereby the influence from nearby transponders and other surrounding sources of interference is minimal. Further, the field is such that a very high coupling efficiency is achieved, which allows for using low excitation power.

Capacitive measurement can easily and reliably be carried out using wide bandwidth, whereby a very comprehensive frequency response test is possible.

An additional advantage of the invention include that the measurement is not sensitive to the exact position of the transponder in the reading zone. Thus, small speed variations or synchronization inaccuracies between tag feed and test operations in the production line do not affect the rest results. This advantage of the invention will be clearly exemplified below.

Advantageous embodiments are subject of the dependent claims. Next the embodiments and advantages are discussed in more detail with reference to the attached drawings.

DETAILED DESCRIPTION OF EMBODIMENTS

Figure 1:
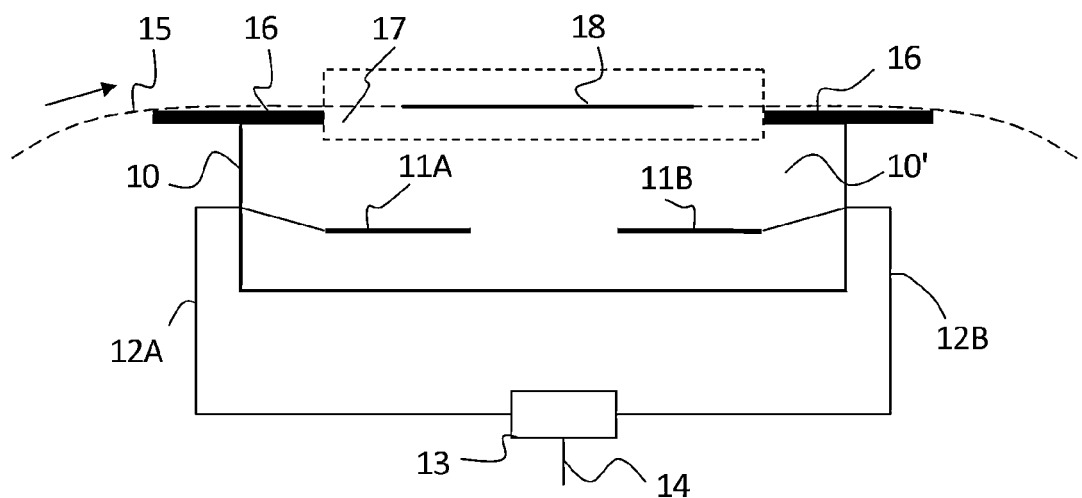
FIG. 1 shows as a schematic side view of a measurement system according to one embodiment of the invention.
Figure 2:
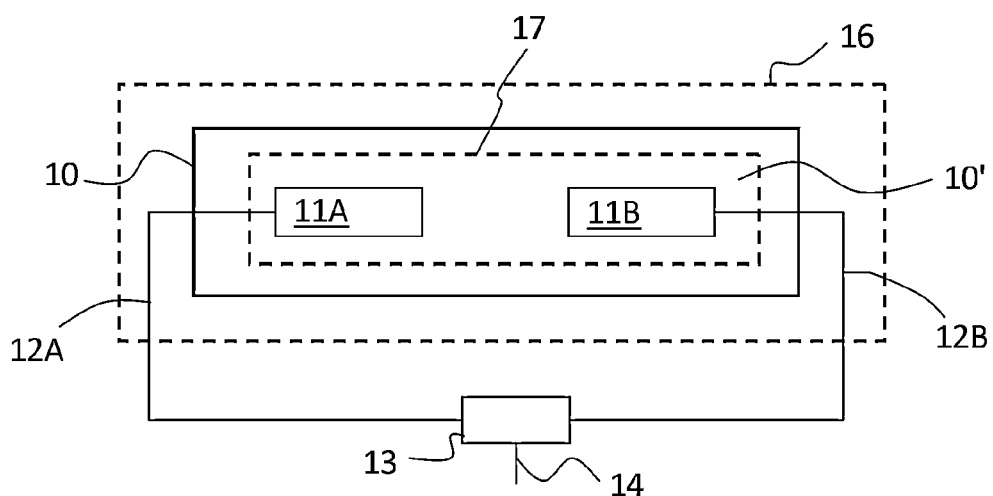
FIG. 2 shows a schematic top view of a measurement system according to FIG. 1.

With reference to FIGS. 1 and 2, the present system can in practice be implemented as follows. An electrically conductive hollow housing 10 is provided. The housing 10 is at least partly open on one side thereof (upper side in FIG. 1) and defines a space 10' within the walls of the housing. In the vicinity of the open side of the housing 10, there is a reading zone 17 for a radio-frequency tag 18.

Within the housing 10, there are provided two conductive electrodes 11A and 11B. The electrodes 11A and 11B are connected to a hybrid coupler 13 using suitable wiring 12A and 12B, respectively. In the hybrid coupler 13, there is a communication terminal 14 for feeding an excitation signal and for reading a response signal.

When an excitation signal is provided at the communications terminal 14, the excitation signals at the electrodes 11A and 11B show a phase difference, which affects the capacitive field inside the housing 10 and at the reading zone in a favorable way.

The housing 10 is dimensioned such that the electric field does not significantly couple to the housing and via the housing from one electrode to the other, but rather to the transponder. The electrodes 11A and 11B are preferably placed at a distance from the walls of the housing which is at least equal to the distance from the electrodes to the transponder 18. In addition, the total distance from the outer end of one electrode 11A to the outer end of the other electrode 11B is preferably about the same as the length of the antenna of the transponder 18. Preferably, the distance is within ±25% of the length of the antenna of the transponder 18.

According to one embodiment, the system comprises means for configuring the position and/or shape (including size) of the electrodes to optimally match with various tag shapes. The configuring may, in practice, comprise changing the position of the electrodes and/or means for changing the electrodes to ones with different shape.

When the excitation signal capacitively couples to the transponder 18, the transponder wakes up and provides a response signal, which can be measured using the electrodes 11A and 11B. The hybrid coupler 13 combines the response signals and a combined response can be read from the communication terminal 14.

According to a preferred embodiment, the hybrid coupler 13 is a 180° hybrid coupler. This definition includes hybrid couplers whose shifting capability at the frequency range used is 180±30°. This embodiment provides optimal results.

However, as mentioned above, the invention is not limited to exactly or even near 180° phase difference, but significant benefits can be expected with smaller or higher mutual phase shifts, such as 10-350°.

According to one embodiment, the electrodes 11A and 11B are arranged symmetrically along a line, as shown in FIGS. 1 and 2. This ensures a symmetric and even field distribution at the reading zone and minimizes the effect of potential dislocations of the transponder at the reading zone.

The electrodes 11A, 11B may be provided, for example, as patterns on a printed circuit board placed inside the housing 10. On the end sides of the housing 10, there may be suitable RF connectors for the external wirings 12A, 12B, if any.

As shown in FIGS. 1 and 2, the housing 10 defines a unitary space 10' within the conductive walls of the housing 10. In other words, there are no separate compartments inside the housing, but both electrodes 11A and 11B are within the same space.

In a preferred embodiment, the opening of the housing 10, defines a void having an area which is larger than the area of the transponder 18 to be tested, the reading zone being in the vicinity of the void. The wall of the housing 10 around the void may act as means to screen any other radio-frequency tag adjacent to the radio-frequency tag to be tested.

In one embodiment, the void, and therefore also the location and also shape of the reading zone 17 is defined by the location and shape of the opening in the unitary housing 17 wall. According to an alternative embodiment, the shape of the reading zone 17 is defined using an additional conductive screening plate 16 which is added on the open side of the housing 10 and in electrical connection with the housing 10. The screening plate 16 comprises an opening corresponding to the desired shape of the reading zone. The shape can be, for example, rectangular, and typically corresponds with the shape of the transponder.

In a simple form the screening plate 16 comprises a plate having outer dimensions larger than corresponding dimensions of the housing 10, and a central opening smaller than corresponding outer dimensions of the housing 10.

Figure 3:
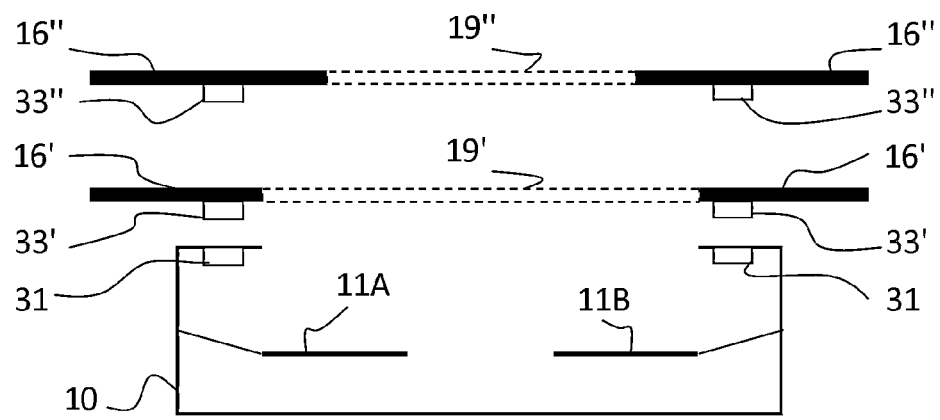
FIG. 3 shows a side view of an embodiment comprising a releasable screening plate.

According to one embodiment, the screening plate is adapted to be releasable. FIG. 3 illustrates this embodiment. On the housing 10, there are attaching means 31, which allow different screening plates 16', 16" having corresponding attaching means 33', 33", respectively, to be attached to the housing 10. The attaching means preferably provide electrical connection between the housing 10 and the screening plate.

According to one embodiment, the attaching means 31, 33', 33" comprise permanent magnets, which provide easy attachment and releasing of the plates 16', 16".

According to one embodiment, the transponders are brought to and read on the reading zone 17 one by one on a belt or roll 15 which is conveyed past the opening of the housing 10 and therefore through the reading zone 17. Thus, the system may comprise means for continuously feeding a plurality of transponders placed on a roll or belt to the reading zone 17 one at a time and means for synchronously testing the tags during said continuous feeding.

According to one embodiment, the grounding plate 16 is shaped to curve at its fringe areas towards the bottom of the housing 10, at least at two opposite lateral sides thereof. This allows for the transponder roll or belt to easily slide on the surface thereof without destroying the transponders.

The transponders, which are typically elongated in shape, can be brought to the reading zone along their longitudinal or transverse direction.

The actual performance measurement preferably includes verifying the correct operation of the tag by using a test command, and measuring the sensitivity and/or the bandwidth of the tag. Sensitivity can be determined e.g. by measuring the activation power of the tag. As concerns the details of the testing, we refer to measurement protocols which are known per se, for example from ISO 18046-3. Since the present measurement is carried out capacitively in near field, the performance of a tag in far field can be estimated for example by

- Measuring the sensitivity of a reference tag in far field,
- Determining the sensitivity margin to an acceptance threshold,
- Measuring the sensitivity of the same reference tag in near field using the method and system as described above,
- Defining the acceptance threshold in near field to correspond to the measured sensitivity in near field taking into account the sensitivity margin determined in far field.

The sensitivity of further tags measured using the present invention can be compared with the acceptance threshold in near field. All tags exceeding the acceptance threshold in near field will be rated as passing the acceptance test also in the far field.

Instead of or in addition to sensitivity, the test can be designed to utilize also other parameters, such as bandwidth.

EXAMPLE

Figure 4A:
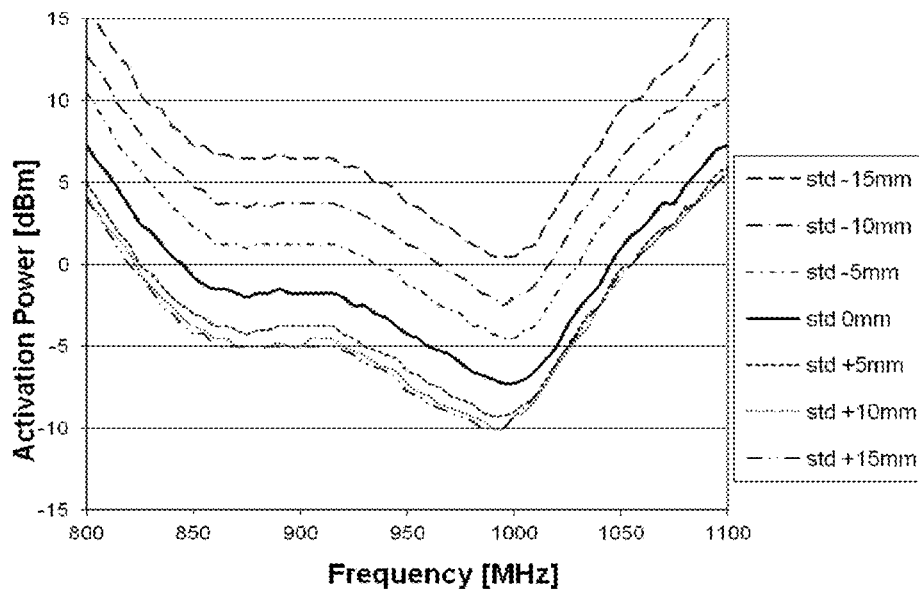
FIGS. 4A and 4B show graphs illustrating the position insensitivity of the measurement system according to the invention by showing activation power measurement results with displaced tags using a conventional system and a system according to the invention, respectively.
Figure 4B:
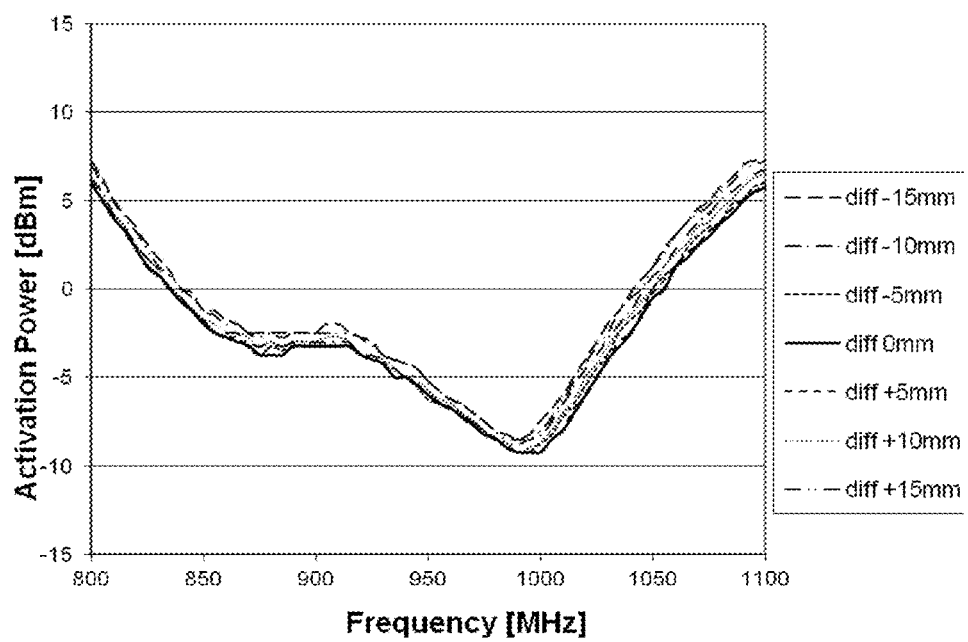

FIGS. 4A and 4B illustrate the usefulness of the present system in relieving tolerance requirements in positioning of tags in the reading zone.

FIG. 4A shows a measurement carried out using a conventional single-phase one-sided excitation. It can be seen that even a 5-millimeter displacement from the optimal location of the tag results in a relatively large change in the activation power needed. A 15-millimeter displacement causes a very significant change. Thus, in order to have comparable measurements, all tags to be tested need to be very accurately positioned on the detection zone.

FIG. 4B shows the results of a similar measurement but using a differential-phase two-sided excitation according to the invention. It can be seen that the activation power needed is almost the same for each position of the tag. Therefore, as the coupling efficiency does not significantly depend of the location of the tag in the reading zone, the testing system provides reliable results irrespective of the exact location of the tag. This provides the possibility to more accurately test the performance of the tags as they slide over the reading zone and travel a distance in the duration of the test.

The invention claimed is:

1. A system for testing radio-frequency tags to estimate the performance of said tags in far field communication, comprising:
   - a reading zone for a radio-frequency tag,
   - at least two electrodes for capacitively coupling to a tag placed in the reading zone,
   - a communication terminal, connected to a hybrid coupler, for feeding a tag excitation signal to the electrodes and for reading tag response signals to be compared to a predetermined sensitivity acceptance threshold defined for said tag based on the sensitivity of a reference radio frequency tag in far field,
   - wherein the hybrid coupler provides capacitive tag excitation signals in near field communications and has a phase difference at each of said electrodes, and said hybrid coupler can receive tag response signals from said electrodes.

2. The system according to claim 1, wherein the hybrid coupler is a 180°±90° hybrid coupler.

3. The system according to claim 1, wherein the number of electrodes is exactly two and the electrodes are arranged symmetrically along a line.

4. The system according to claim 1, wherein the at least two electrodes are placed in a unitary space defined by electrically conductive walls.

5. The system according to claim 1, further comprising:
   - a void having an area which is larger than the area of the radio-frequency tag to be tested, the reading zone being in the vicinity of the void, and
   - screening means defining said void, the screening means being adapted to screen and/or ground any other radio-frequency tag adjacent to the radio-frequency tag to be tested.

6. The system according to claim 5, wherein the screening means comprises a conductive plate having a central aperture forming said void.

7. The system according to claim 1, further comprising means for continuously feeding a plurality of tags placed on a roll to the reading zone one at a time and means for synchronously testing the tags during said continuous feeding.

8. The system according to claim 1, wherein said testing includes measuring the sensitivity and/or the bandwidth of the tag.

9. The system according to claim 1, further comprising means (31;16',33';16",33") for configuring the position and/or shape of the electrodes.

* * * * *